(12) United States Patent
Velhal et al.

(10) Patent No.: US 7,538,668 B2
(45) Date of Patent: *May 26, 2009

(54) COMPUTING PLATFORM SECURITY APPARATUS, SYSTEMS, AND METHODS

(75) Inventors: Ravindra V. Velhal, Beaverton, OR (US); Jeetendra G. Deshmukh, Portland, OR (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/859,567

(22) Filed: Sep. 21, 2007

(65) Prior Publication Data
US 2008/0007406 A1 Jan. 10, 2008

Related U.S. Application Data

(63) Continuation of application No. 11/007,466, filed on Dec. 8, 2004, now Pat. No. 7,352,283.

(51) Int. Cl.
*G08B 1/08* (2006.01)
(52) U.S. Cl. .................. 340/539.13; 340/539.11; 340/539.17; 340/572.4
(58) Field of Classification Search .......... 340/539.11, 340/539.13, 539.16, 539.17, 572.1, 572.4, 340/286.01, 286.06; 709/220, 221, 233; 713/1, 2; 341/50
See application file for complete search history.

(56) References Cited

U.S. PATENT DOCUMENTS

| 6,040,789 A * | 3/2000 | Nishida et al. ............. 341/50 |
| 6,178,468 B1 | 1/2001 | Rudd et al. |
| 6,687,820 B2 | 2/2004 | French et al. |
| 6,963,981 B1 | 11/2005 | Bailey et al. |
| 7,039,520 B2 | 5/2006 | Draeger et al. |
| 7,054,947 B2 | 5/2006 | Yun |
| 7,245,258 B2 | 7/2007 | Velhal et al. |
| 2001/0009427 A1 | 7/2001 | Kaneko et al. |
| 2003/0100339 A1 | 5/2003 | Chen et al. |
| 2004/0039523 A1 | 2/2004 | Kainuma et al. |
| 2005/0285789 A1 | 12/2005 | Velhal et al. |
| 2006/0132307 A1 | 6/2006 | Velhal et al. |
| 2006/0272020 A1 | 11/2006 | Gardner |

FOREIGN PATENT DOCUMENTS

EP     1273721 A1     1/2003

(Continued)

OTHER PUBLICATIONS

"U.S. Appl. No. 11/007,466, Amendment Under 37 CFR 1.312 filed Oct. 16, 2007", 7 pgs.

(Continued)

*Primary Examiner*—Van T. Trieu
(74) *Attorney, Agent, or Firm*—Schwegman, Lundberg & Woessner, P.A.

(57) ABSTRACT

Apparatus and systems, as well as methods and articles, may operate to receive status from an operating system (OS)-independent module capable of providing OS-independent geolocation information associated with a device to a network at some time before executing an operating system.

25 Claims, 3 Drawing Sheets

FOREIGN PATENT DOCUMENTS

| | | |
|---|---|---|
| JP | 62-261012 | 11/1987 |
| JP | 2002-350145 | 12/2002 |
| WO | WO-9724584 A1 | 7/1997 |
| WO | WO-2006007298 A1 | 1/2006 |

OTHER PUBLICATIONS

"U.S. Appl. No. 11/007,466, Notice of Allowance mailed Oct. 10, 2007", 4 pgs.

"U.S. Appl. No. 11/007,466, PTO Response to Rule 312 Communication mailed Oct. 26, 2007", 2 pgs.

"U.S. Appl. No. 11/007,466, Supplemental Notice of Allowance mailed Oct. 26, 2007", 3 pgs.

"U.S. Appl. No. 11/007,466 Notice of Allowance mailed Sep. 19, 2006", 9 pgs.

Sun, Jiming, "Case Study: Enhancing Pre-Boot Environment with EFI Applications", *Intel Developer Forum*, Sep. 9-12, 2002, Available at http://cnscenter.future.co.kr/resource/rsc-center/presentation/intel/fall2002/EFI092PS.pdf,(Sep. 9, 2002), 19 pages.

"Extensible Firmware Interface", Available at http://www.intel.com/technology/efi/, 2 pages.

"International Search Report for corresponding PCT Application No. PCT/US2005/019883", (Aug. 11, 2005),5 pgs.

"Non-final office action mailed Jun. 8, 2006 in U.S. Appl. No. 10/877,258", 10 pgs.

"Notice of allowance mailed Mar. 5, 2007 in U.S. Appl. No. 10/877,258", 8 pgs.

"Notice of allowance mailed Nov. 15, 2006 in U.S. Appl. No. 10/877,258", 8 pgs.

"Response and Appendix A filed Sep. 8, 2006 to non-final office action mailed Jun. 8, 2006 in U.S. Appl. No. 10/877,258", 35 pgs.

"U.S. Appl. No. 11/007,466 Notice of Allowance mailed Apr. 20, 2007", 6 pgs.

* cited by examiner

COMPUTING PLATFORM SECURITY APPARATUS, SYSTEMS, AND METHODS

RELATED APPLICATION

This application is a continuation of U.S. patent application Ser. No. 11/007,466, titled "COMPUTING PLATFORM SECURITY APPARATUS, SYSTEMS, AND METHODS," by Ravindra V. Veihal, Jeetendra G. Deshmukh, and Nikhil M. Deshpande, filed on Dec. 8, 2004, now issued as U.S. Pat. No. 7,352,283. and incorporated herein by reference.

TECHNICAL FIELD

Various embodiments described herein relate to information processing generally, including apparatus, systems, and methods used in geolocation information processing.

BACKGROUND INFORMATION

Geolocation information may be acquired, processed, and displayed using global positioning system receivers and other systems employing, for example, triangulation based upon timing signals, phase shifts, signal strengths, and/or other parameters associated with radio frequency signals. Such geolocation receivers and systems may employ software operating systems to control hardware that acquires and processes geolocation information, and may suffer from geolocation information loss when the operating system (OS) is corrupt or otherwise unavailable.

The small size and weight of a mobile computing device may render it particularly vulnerable to loss and theft. A mobile device OS may, for example, be removed by an unauthorized party after the device is lost or stolen ("missing"). Sensitive data stored on the device may be compromised in this situation.

DETAILED DESCRIPTION

Various embodiments disclosed herein may operate to determine that a computing device is missing, including a portable (mobile) computing device, to derive a location of the missing device, and/or to alert appropriate entities. Some embodiments may utilize an OS-independent location awareness capability, perhaps built into the portable computing device, to derive the device location. Such capability may enable the missing device to report geolocation information and/or device status to a wired or wireless network at a time when the device OS is inactive, removed, or otherwise unavailable.

Figure 1:
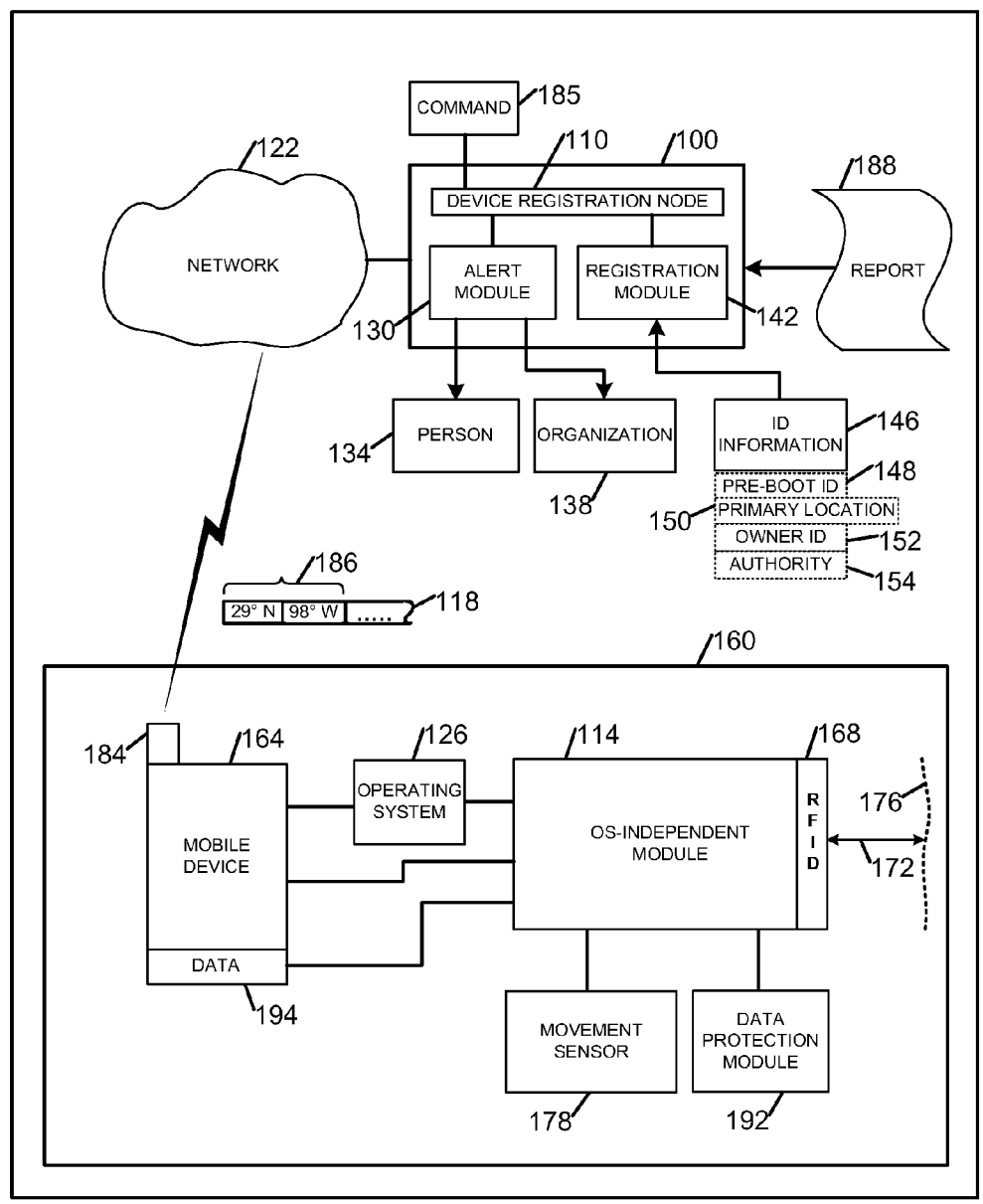
FIG. 1 is a block diagram of an apparatus and a system according to various embodiments of the invention.

FIG. 1 comprises a block diagram of apparatus 100, 160 and a system 180 according to various embodiments of the invention, each of which may operate as previously described. For simplicity, some embodiments may describe a location of an operating system-independent module coupled to a device, including a computing device, and/or operations to be performed by or relative to the module. It should be noted that the OS-independent module may be attached to, co-located with, or separated from the device.

The apparatus 100 may include a device registration node (DRN) 110 to communicate with one or more OS-independent modules 114, and to receive from the module 114 OS-independent geolocation information 118 associated with a device, including perhaps with a mobile computing device 164. The OS-independent geolocation information 118 may be used to locate the OS-independent module 114 with respect to a grid or to some other known reference (e.g., in the form of global positioning system (GPS) coordinates). The OS-independent module 114 may be capable of providing the OS-independent geolocation information 118 to a network 122 at a time before executing an OS 126, upon request (e.g., via polling) and/or by alerting the DRN 110 (e.g., via an interrupt).

The apparatus 100 may also include an alert module 130 coupled to the DRN 110 to communicate the OS-independent geolocation information 118 to a selected person 134 and/or to a selected organization 138. The apparatus 100 may further include a registration module 142 coupled to the DRN 110 to receive and/or to store identification information 146 associated with one or more OS-independent modules 114. The identification information 146 may include, for example, identification numbers and/or parameters associated with the OS-independent module 114, perhaps comprising an identification number 148, a primary location 150, one or more owner identification parameters 152, and/or one or more authority identification parameters 154. The authority identification parameter 154 may include contact information associated with a governmental agency, such as a police department, for example.

In some embodiments, an apparatus 160 may include an OS-independent module 114 to couple to an OS 126, wherein the OS-independent module 114 is capable of providing OS-independent geolocation information 118 to a network 122 at some time before executing the OS 126, as previously described. The apparatus 160 may also include a device, perhaps comprising a mobile computing device 164, coupled to the OS-independent module 114. In some embodiments of the apparatus 160, the mobile computing device 164 may comprise a hand-held computer, a laptop computer, a personal digital assistant, and/or a cellular telephone.

Some embodiments of the apparatus 160 may further include a radio frequency identification (RFID) tag 168 to be sensed to determine a distance 172 between the OS-independent module 114 and a selected location 176. Some embodiments of the apparatus 160 may sense the RFID tag 168 to determine a location of the OS-independent module 114 relative to a grid. For example, RFID readers placed at various hallway locations within a building may track movement of a mobile computing device 164 equipped with an OS-independent module 114. Some embodiments of the apparatus 160 may also include a movement-sensing device 178, such as an accelerometer to determine movement of the OS-independent module 114. Other embodiments may be realized.

For example, a system 180 may include apparatus 100, 160 as well as an antenna 184 (e.g., an omnidirectional antenna, a patch antenna, a dipole antenna, among others) coupled to the OS-independent module 114. In some embodiments of the system 180, a device, including perhaps a mobile computing device 164 coupled to an OS-independent module 114, may include an Institute of Electrical and Electronic Engineers (IEEE) 802.11 device, a general packet radio service (GPRS) device, a Global Positioning System (GPS) device, and/or a wideband code-division multiple-access (WCDMA) device.

For further information regarding the 802.11 and WCDMA standards, please consult "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments; and "CDMA 2000 Series, Release A (2000)" and related documents, available from the Telecommunications Industry Association (TIA) Internet website at a URL that includes "tiaonline.org/standards/search.cfm?keyword=IS+2000* ", respectively. Information regarding GSM/GPRS is currently available from the Internet at a URL that includes "gsmworld.com/index.shtml" (GSM Association) and from a URL that includes "gsmworld.com/documents/ireg/ir40310.pdf" (GSM Association document PRD IR-40, Guidelines for IP4 Addressing and AS Numbering for GPRS Network Infrastructure and Mobile Terminals, Version 3.1.0: 2001).

Receiving the geolocation information 118 from a DRN 110 may, in some embodiments of the system 180, be responsive to a command 185 (e.g., from operations personnel managing the DRN 110) to determine a position 186 of the OS-independent module 114. Receiving the geolocation information 118 may also be responsive to a missing equipment report 188 that has been registered on the DRN 110. The missing equipment report 188 may be supplied by a person 134 and/or an organization 138 (including, e.g., operations personnel associated with the DRN 110), and may include identification information associated with an OS-independent module 114 reported as lost and/or stolen.

The system 180 may also include a data protection module 192 coupled to the OS-independent module 114 to disable a device, including perhaps the mobile computing device 164, password protect selected data 194, and/or render the selected data 194 unreadable.

Thus, in one possible scenario selected from many, the apparatus 100, 160 and system 180 may operate as follows. A portable computing device to be protected, perhaps incorporating one or more elements of the apparatus 160, may be registered with a DRN 110 (e.g., using a subscription program). Upon loss or theft of the device, authorized personnel may file a missing device report with the DRN 110. In some embodiments, the device, and/or a sensor at a location where the device is used, may operate to file the report based upon sensing a change in an environmental parameter. For example, a radio-frequency identification (RFID) tag 168 embedded within the device and/or an RFID reader electromagnetically coupled to the RFID tag 168 may sense a loss of a coupling signal (e.g., a signal existing between the RFID tag and the reader). The reader and/or the missing device may thereafter report the loss of signal to the DRN 110 to indicate that the portable computing device was removed from a workstation, a room, or a building, for example.

Upon receiving the missing device report, the DRN 110 may query the missing device for status. The device may respond with status information, including a device position 186. The DRN 110 may then alert and/or periodically update authorized personnel, including authorities, with the information. In some embodiments, the missing device may act to render sensitive data contained in local files unreadable and/or inaccessible. The action to protect data may be initiated by the missing device, and/or by a command from the DRN 110. It should be noted that while mobile devices have generally been described as the most likely to be stolen or lost, various embodiments described herein may well be used in conjunction with, or incorporated into, devices that are not usually considered to be mobile, such as desk top computers and rack-mounted servers, among others.

The apparatus 100, 160; DRN 110; OS-independent module 114; geolocation information 118; network 122; operating system 126; alert module 130; person 134; organization 138; registration module 142; identification information 146; identification number 148; primary location 150; owner identification parameter 152; authority identification parameter 154; mobile computing device 164; RFID tag 168; distance 172; location 176; accelerometer 178; system 180; antenna 184; command 185; position 186; missing equipment report 188; data protection module 192; and data 194 may all be characterized as "modules" herein.

Such modules may include hardware circuitry, single and/or multi-processor circuits, memory circuits, software program modules and objects, and/or firmware, and combinations thereof, as desired by the architect of the apparatus 100, 160 and system 180, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in applications other than computing platform security; and thus, various embodiments are not to be so limited. The illustrations of apparatus 100, 160 and system 180 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single and/or multi-processor modules, single and/or multiple embedded processors, data switches, and application-specific modules, including multi-layer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
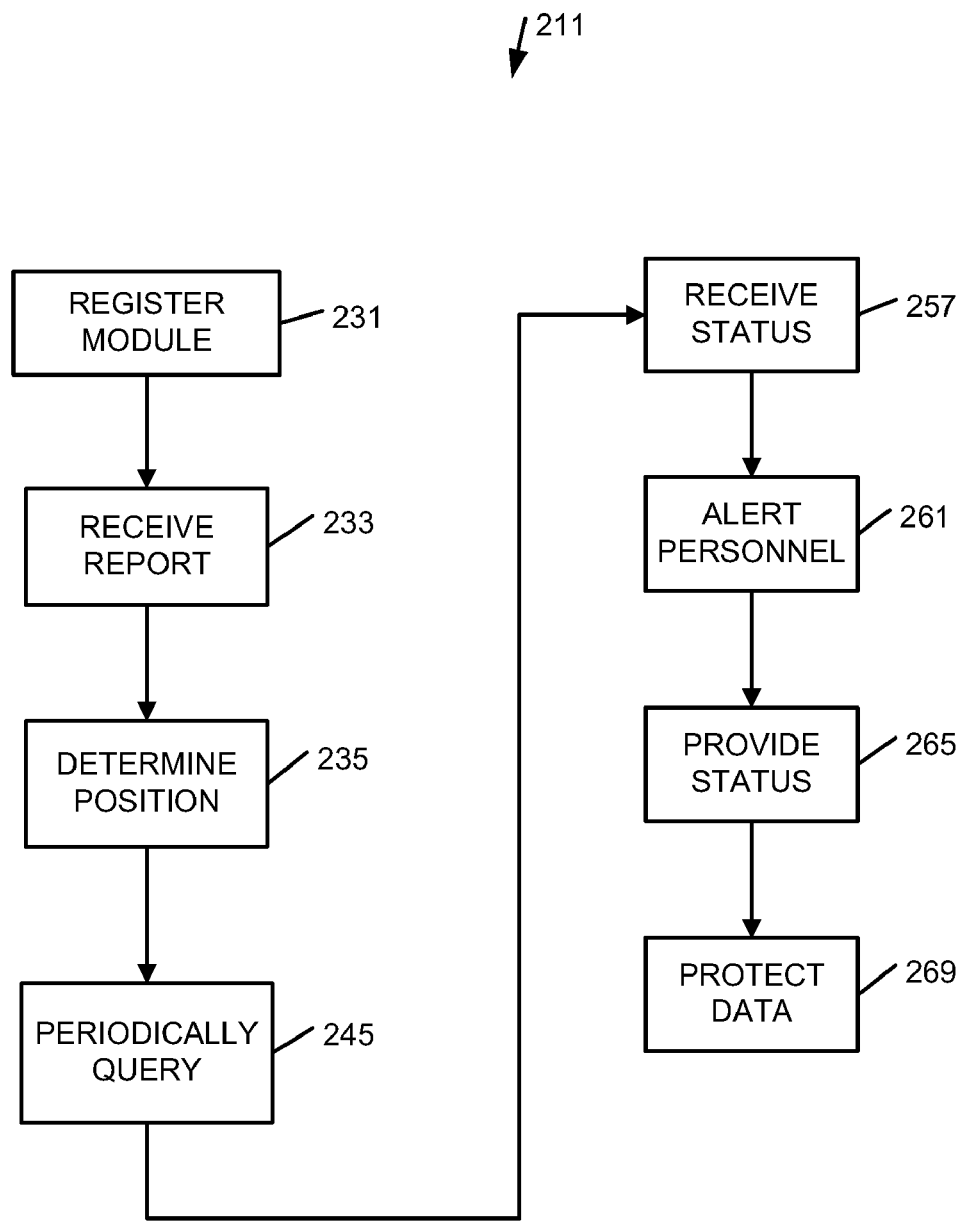
FIG. 2 is a flow diagram illustrating several methods according to various embodiments of the invention.

For example, FIG. 2 is a flow diagram illustrating several methods 211 according to various embodiments of the invention. A method 211 may (optionally) begin at block 231 with registering with a DRN an OS-independent module capable of providing OS-independent geolocation information to a network at some time before executing an OS.

The method 211 may continue at block 233 with receiving a missing equipment report at the DRN. The missing equipment report may comprise a notification from a selected person and/or a selected organization, including a notification that a mobile computing device ("equipment") has been lost or stolen. The missing equipment report may also comprise an alarm associated with an OS-independent module state (e.g., a state of "missing" or "not missing"). Thus, equipment containing an OS-independent module capable of recognizing a missing equipment state may generate the alarm to the DRN, across a network.

The method 211 may include determining an OS-independent module geolocation position at block 235. The method 211 may further include periodically querying the OS-independent module to determine the status at block 245. At block 257, the method 211 may also include receiving the status, including the OS-independent module geolocation position, at the DRN. The method 211 may continue at block 261 with alerting selected persons and/or organizations, and/or providing the status to the persons/organizations at block 265. Finally, at block 269 the method 211 may include rendering data stored in a storage subsystem coupled to a mobile computing device unreadable, perhaps following a selected interval, such as an interval calculated after an alarm or alert has been generated, or a status report has been provided.

It should be noted that the methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
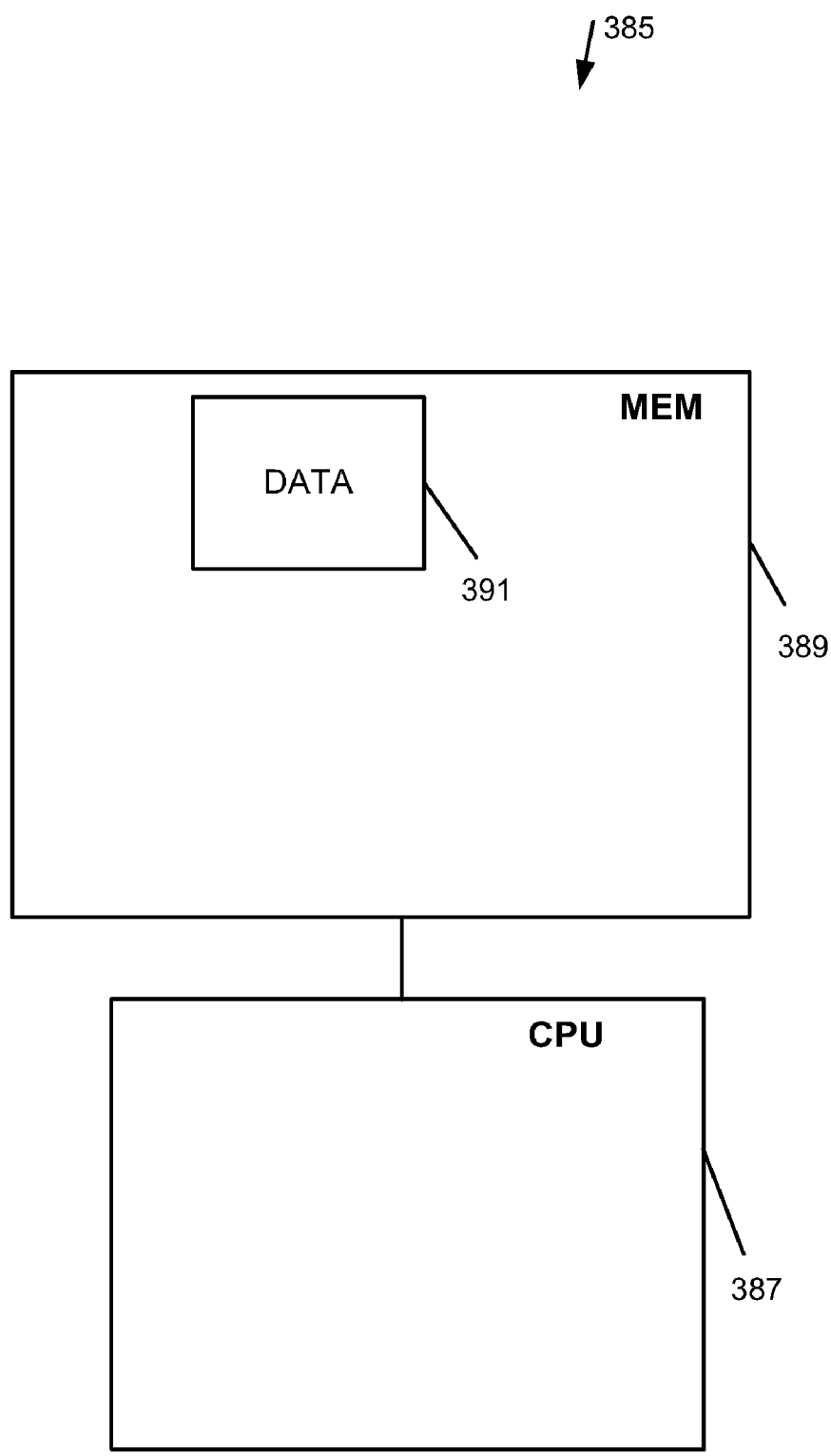
FIG. 3 is a block diagram of an article according to various embodiments of the invention.

For example, FIG. 3 is a block diagram of an article 385 according to various embodiments of the invention. Examples of such embodiments may comprise a computer, a memory system, a magnetic or optical disk, some other storage device, and/or any type of electronic device or system. The article 385 may include one or more processors 387 coupled to a machine-accessible medium such as a memory 389 (e.g., a memory including an electrical, optical, or electromagnetic conductor) having associated information 391 (e.g., computer program instructions and/or data), which, when accessed, results in a machine (e.g., the processor(s) 387) performing such actions as receiving status at a DRN from one or more OS-independent modules capable of providing OS-independent geolocation information to a network some time before executing an OS.

Other activities may include periodically querying the OS-independent module(s) to determine the status. Finally, the activities may include rendering unreadable data stored in a storage subsystem coupled to a computing device, including a mobile computing device, following a selected interval.

Implementing the apparatus, systems, and methods disclosed herein may aid in identifying and/or tracking missing computing devices, including those that are location-aware and pre-boot enabled. In some embodiments, data security may also be preserved.

Although the inventive concept may be discussed in the exemplary context of an 802.xx implementation (e.g., 802.11a, 802.11g, 802.11HT, 802.16, etc.), the claims are not so limited. Indeed, embodiments of the present invention may well be implemented as part of any wired and/or wireless system Examples may also include embodiments comprising multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
a device registration node to communicate with at least one operating system (OS)-independent module capable of providing OS-independent geolocation information to a network at a time when an OS is unavailable and to receive the geolocation information.

2. The apparatus of claim 1, further including:
an alert module coupled to the device registration node to communicate the OS-independent geolocation information to at least one of a selected person or a selected organization.

3. The apparatus of claim 1, further including:
a registration module coupled to the device registration node to receive and store identification information associated with the at least one OS-independent module.

4. The apparatus of claim 3, wherein the identification information comprises at least one of an identification number associated with the OS-independent module, a primary location associated with the OS-independent module, at least one owner identification parameter associated with the OS-independent module, or at least one authority identification parameter associated with the OS-independent module.

5. An apparatus, including: an operating system (OS)-independent module to couple to an OS, the OS-independent module capable of providing OS-independent geolocation information to a network at a time when the OS is unavailable.

6. The apparatus of claim 5, further including:
a radio-frequency identification (RFID) tag communicatively coupled to the OS-independent module, the RFID tag to be sensed to determine a distance of the OS-independent module from a selected location.

7. The apparatus of claim 6, wherein the OS-independent module is configured to sense the RFID tag to determine a location of the OS-independent module relative to a grid.

8. The apparatus of claim 5, further including:
an accelerometer coupled to the OS-independent module to determine a movement of the OS-independent module.

9. A system, including:
a device registration node to conixnunicate with an operating system (OS)-independent module to receive OS-independent geolocation information from the OS-independent module, the OS-independent module being capable of providing the OS-independent geolocation information to a network at a time when an OS is unavailable; and
an omnidirectional antenna coupled to the OS-independent module.

10. The system of claim 9, further including:
an alert module coupled to the device registration node to communicate the OS-independent geolocation information to at least one of a selected person or a selected orgarnzation.

11. A system, including:
an operating system (OS)-independent module to couple to an OS, the OS-independent module to provide OS-independent geolocation information to a network at a time when the OS is unavailable; and
an omnidirectional antenna coupled to the OS-independent module.

12. The system of claim 11, further including:
a data protection module coupled to the OS-independent module to perform at least one of disabling the mobile computing device, password protecting selected data, or rendering the selected data unreadable.

13. The system of claim 11, further including:
a device registration node to communicate with the OS-independent module to receive the OS-independent geolocation information.

14. The system of claim 13, wherein the OS-independent module is configured to alert the device registration node with the geolocation information.

15. The system of claim 13, wherein the device registration node is configured to receive the OS-independent geolocation information if a missing equipment report is registered at the device registration node.

16. The system of claim 15, wherein the missing equipment report includes identification information associated with at least one of an OS-independent module reported as lost or an OS-independent module reported as stolen.

17. The system of claim 13, wherein the device registration node is configured to receive the OS-independent geolocation information responsive to a command to determine at least one position of the OS-independent module.

18. A method, including:
receiving status at a device registration node from an operating system (OS)-independent module capable of providing OS-independent geolocation information to a network at a time when an OS is unavailable.

19. The method of claim 18, further including:
registering the OS-independent module with the device registration node.

20. The method of claim 18, further including:
receiving a missing equipment report at the device registration node.

21. The method of claim 20, further including:
rendering data stored in a storage subsystem coupled to the mobile computing device unreadable if the missing equipment report indicates that the mobile computing device is at least one of lost or stolen.

22. The method of claim 20, wherein the missing equipment report comprises at least one of an alarm associated with an OS-independent module state or a notification from at least one of a selected person or a selected organization.

23. The method of claim 18, further including:
determining a geolocation position of the OS-independent module.

24. The method of claim 18, wherein the status comprises a geolocation position of the OS-independent module.

25. The method of claim 18, further including:
alerting at least one of a selected person or a selected organization; and providing the status to the selected person or to the selected organization.

* * * * *

UNITED STATES PATENT AND TRADEMARK OFFICE
CERTIFICATE OF CORRECTION

PATENT NO.        : 7,538,668 B2
APPLICATION NO.   : 11/859567
DATED             : May 26, 2009
INVENTOR(S)       : Velhal et al.

Page 1 of 1

It is certified that error appears in the above-identified patent and that said Letters Patent is hereby corrected as shown below:

In column 1, line 9, delete "Veihal," and insert -- Velhal, --, therefor.

In column 1, line 11, delete "7,352,283." and insert -- 7,352,283, --, therefor.

In column 7, line 42, in Claim 9, delete "conixnunicate" and insert -- communicate --, therefor.

In column 7, line 55, in Claim 10, delete "orgarnzation." and insert -- organization. --, therefor.

Signed and Sealed this

Fourth Day of August, 2009

JOHN DOLL
*Acting Director of the United States Patent and Trademark Office*